April 8, 1930.　　　T. H. WILLIAMS　　　1,753,633
CARLINE BRACKET
Filed May 31, 1923　　　2 Sheets-Sheet 2

Inventor:
Theron H. Williams
By Munday Clarke & Carpenter
Attys.

Patented Apr. 8, 1930

1,753,633

UNITED STATES PATENT OFFICE

THERON H. WILLIAMS, OF CHICAGO, ILLINOIS, ASSIGNOR, BY MESNE ASSIGNMENTS, TO CHICAGO-CLEVELAND CAR ROOFING COMPANY, OF CHICAGO, ILLINOIS, A CORPORATION OF DELAWARE

CARLINE BRACKET

Application filed May 31, 1923. Serial No. 642,425.

This invention relates to improvements in brackets adapted for bracing carlines in car roof constructions.

Objects of the invention are: the provision of a carline bracket, formed as an integral unit, having a plurality of rigidifying parts and adapted to effectively tie the carlines and side plates together; the provision of such a bracket that is capable of receiving a pulley, or block and fall, so that an automobile or other loads may be hoisted within a freight car and held suspended therein while a supporting frame for the automobile is built up beneath it; the provision of a bracket having the above characteristics that is adapted to receive a rod. These carline brackets are secured beneath each carline and as the carlines are usually positioned 37 inches from each other it may be desirable to secure a rod through each carline bracket thereby enabling the shipper of automobiles to suspend the automobile at any point inside the car. If no provision is made for the rods the shipper must hook up his pulley beneath the carlines or through the brackets that are located 37 inches from each other. A further object of the invention is the provision of a bracket adapted to be secured at any point in the car, irrespective of the carlines, capable of receiving the elements used in hoisting automobiles, said bracket being capable of simple attachment, of requisite strength and rigidity, and yet easily and cheaply manufactured. And the invention has such other objects and advantages as are found to obtain in the structures hereinafter set forth and claimed.

In the accompanying drawings, forming a part of this specification and showing, for purposes of exemplification, a preferred form and manner in which the invention may be embodied and practiced, but without limiting the claimed invention specifically to such illustrative instance or instances:

Figure 1:
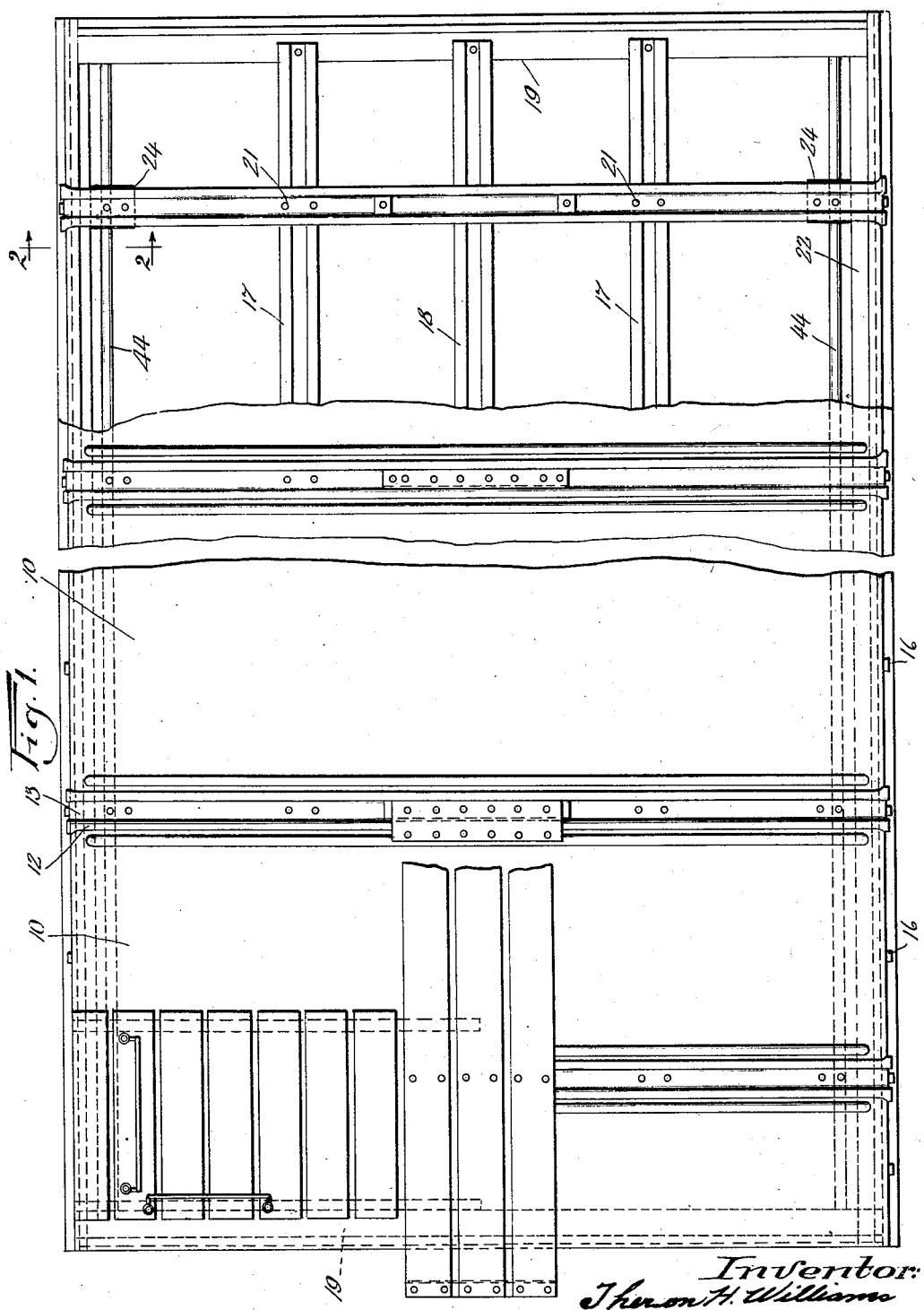
Figure 1 is a top plan view of a car roof embodying the invention, parts being broken away to illustrate the framework of the car roof.
Figure 2:
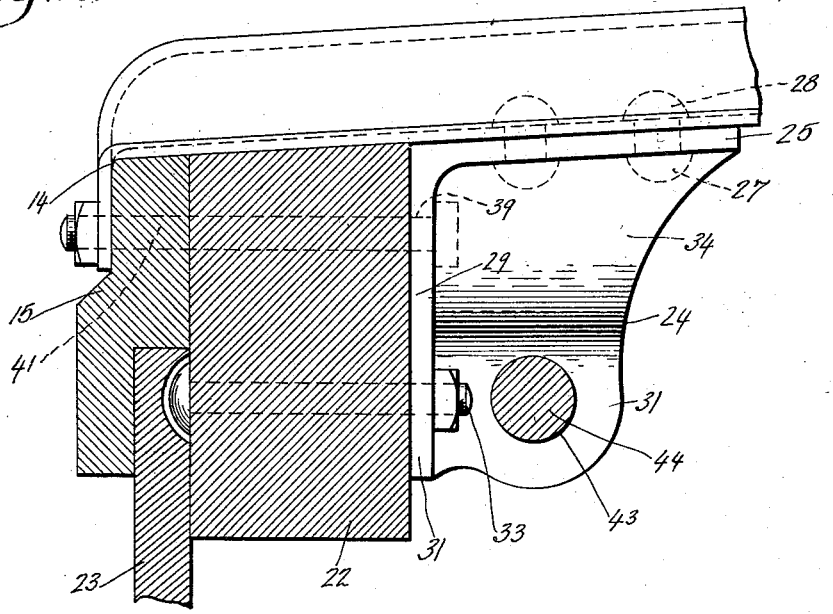
Fig. 2 is a vertical section taken on the line 2—2 of Fig. 1 showing the bracket secured to the side plate and to the carline.
Figure 3:
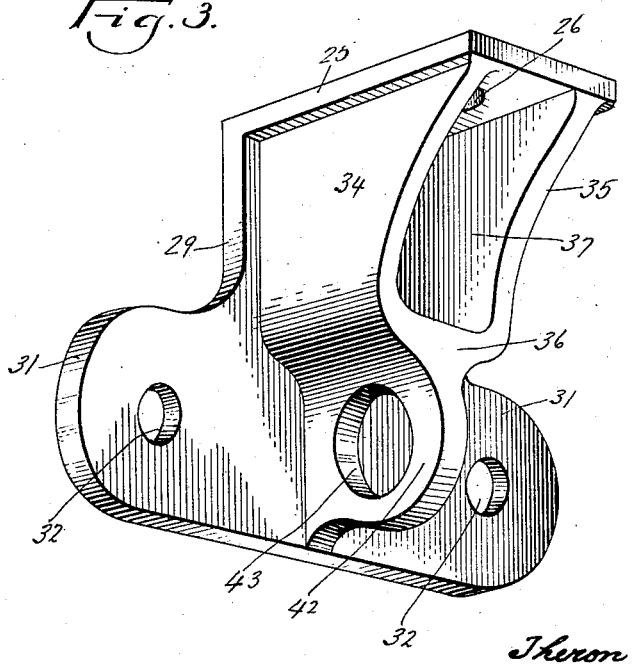
Fig. 3 is a perspective view of the bracket.

Referring to the drawings, there is shown a car roof embodying metallic roof sheets 10 extending across the car from eaves to eaves, said roof sheets having lateral flanging that engage flanging 12 of outside metallic carlines 13. The edges of the roof sheets at the eaves edge of the roof terminate in downwardly extending flanging 14, and the ends or the carlines at each eaves edge terminate similarly. The roof sheets are held against the side fascia 15, intermediate the carline vertical flanging, by bolts 16. The carlines are supported intermediate the eaves edges of the roof by metallic purlins 17 and a metallic ridge pole 18 that are secured to the end plates 19. The carlines are fastened to the ridge pole and purlins by any suitable fastening means, for example by rivets 21. At the eaves edges of the roof the carlines are supported by and rest upon the side plates 22 that extend longitudinally of the car, the side plates shown in the present instance being constructed of wood, but of course may be constructed of other suitable material. Interposed between the side plates and side fascia and extending downwardly therefrom is the side sheathing or wall 23 of the car.

Metallic brackets 24 are secured on the inside of the car against the side plate and beneath each carline in order to brace the carline and tie the side plates and carlines together, and each bracket is, in the present instance, constructed or cast as an integral unit and consists of a substantially flat top or carline engaging member 25 having apertures 26 therein through which extend rivets 27 that secure the brackets to the carline as shown at 28. Extending at right angles to said carline engaging member is a substantially flat, vertical, rear or side plate, engaging member 29, said member having extensions thereon extending longitudinally of the car as shown at 31. These extensions 31 are also provided with apertures 32 through which extend bolts 33 that pass through the side plates to fasten the lower edges of the bracket tightly to the side plates. Protruding from the side plate engaging member and extending downwardly from the carline engaging member are two rigidifying bracket parts 34 and 35 that converge at their lower extremities and join at 36 to form a pocket 37 that facilitates riveting of the carline engaging member to the carline. An aperture 39 is located in the side plate engaging member, intermediate the two rigidifying parts 34 and 35, the carline engaging member and the joint 36. A bolt 41 extends through this aperture and through the side plate, side sheating and vertical flange of the carline. Extending downwardly from the joint 36 is a single member 42 forming a continuation of the rigidifying parts 34 and 35 and this member 42 is apertured at 43. The rigidifying parts 34 and 35, joint 36 and the single member 43 together form the rigidifying member for the carline bracket.

Each carline is located 37 inches from the next one, and as a bracket such as just described is secured at each end of each carline, all these brackets may be so secured as to line up the apertures 43. If desired, a rod 44 may be passed through the apertures 43 of all the carlines on either side of the car. The rod may extend from one end of the car to the other or a plurality of rods may be used instead of a single rod.

From the foregoing it will be noted that a block and fall or a pulley may be hooked through the aperture 43, in a carline bracket such as above described, or over the rod 44, and the automobile hoisted up and held suspended within the car while a platform is built beneath the automobile; and it will also be noted that this carline bracket and rod is also capable of use separate from the carline.

The invention as hereinabove set forth is embodied in a particular form of construction but may be variously embodied within the scope of the claims hereinafter made.

I claim:

1. A carline bracket comprising, a carline engaging member; a side plate engaging member; a plurality of rigidifying parts for said carline and side plate engaging members; said rigidifying parts converging at their lower ends to provide a pulley supporting member.

2. A carline bracket comprising: a carline engaging member; a side plate engaging member; rigidifying parts formed integrally with said carline and side plate engaging members; said rigidifying parts extending downwardly from said carline engaging member and outwardly from said side plate engaging member and joining at their lower ends in a single rigidifying extension of said rigidifying parts, said rigidifying parts and extension forming a rigidifying member for said carline and side plate engaging members.

THERON H. WILLIAMS.